UNITED STATES PATENT OFFICE.

GEORG LIST, OF OFFENBACH-ON-THE-MAIN, GERMANY, ASSIGNOR TO THE CORPORATION OF CHEMISCHE FABRIK GRIESHEIM-ELECTRON, OF FRANKFORT-ON-THE-MAIN, GERMANY.

BROWN SULFUR DYE AND PROCESS OF MAKING SAME.

No. 889,936. Specification of Letters Patent. Patented June 9, 1908.

Application filed February 24, 1908. Serial No. 417,295.

*To all whom it may concern:*

Be it known that I, GEORG LIST, doctor of philosophy, chemist, a subject of the German Emperor, and resident of Offenbach-on-the-Main, Grand Duchy of Hesse, Germany, with the post-office address Obermainstrasse No. 79, have invented new and useful Improvements in Brown Sulfur Dyes and Processes of Making Same, of which the following is a specification.

I have found that new brown sulfur dyestuffs are obtained by melting together aromatic metadinitro compounds of the general formula:

$$C_6H_3X-(NO_2)_2-$$

wherein X means $$H, CH_3, Cl, NH.C_6H_5, NH.C_6H_4.CH_3, -S-$$

and its products of reduction with glycerin and alkaline polysulfids. In this melting process the glycerin acts not as a thinning substance but it participates in the formation of dyestuffs. The dyestuffs thus obtained are different from those obtained by melting the said compounds alone with alkaline polysulfids. By melting dinitrochlorbenzene with alkaline polysulfids f. i. a dyestuff is obtained which dyes cotton olive green shades.

My new dyestuffs dye cotton from a bath containing sodium sulfid bright brown shades of good fastness properties.

The following example illustrates how the production of the new coloring matter may be carried out. Parts being by weight.

Example: 500 parts of dinitrochlorbenzene and 230 parts of glycerin are introduced while stirring in a melt prepared from 2000 parts of crystallized sodium sulfid and 500 parts of sulfur. When the reaction has taken place the oil bath is heated up by and by to 200° C. and maintained at this temperature for 4 to 5 hours. The melt is then further heated in a bake-oven to 235°–240° C. for 4 hours. When cooled down the rough melt is ground. It is a gray brown powder readily soluble in water and dyeing unmordanted cotton bright brown shades showing a reddish yellow shade when looking over the hand. In analogous manner other dinitro compounds may be used in the melting process. The relative proportions of sulfur and sodium sulfid and of the starting material may be varied within wide limits without essentially altering the result. The melting process may be carried out in the presence of heavy metal salts f. i. copper sulfate or chlorid of zinc the shades getting deeper and brighter, the fastness properties remaining generally the same.

The following table will serve to show the tinctorial properties of some of the dyestuffs obtainable from aromatic dinitro compounds according to the process hereinbefore described.

| Starting material. | Melted together with alkaline polysulfids and glycerin dyes cotton— |
|---|---|
| Metadinitrobenzene and products of reduction thereof. | Brown. |
| Metadinitrotoluene and products of reduction thereof. | Brown. |
| 4:2:1—Dinitrochlorbenzene | Brown. |
| Dinintrophenylamin.   | Blackish brown. |
| Disdinitrophenylsulfid. 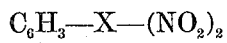  | Brown. |

Now what I claim and desire to secure by Letters Patent is the following:

1. The process of manufacturing brown sulfur dyes consisting in melting together aromatic metadinitro compounds of the general formula:

$$C_6H_3-X-(NO_2)_2,$$

wherein X means $$H, CH_3, Cl, NH.C_6H_5, NH.C_6H_4.CH_3, -S-,$$

with glycerin and alkaline polysulfids.

2. As new articles of manufacture the sulfur dyestuffs obtained by melting together aromatic metadinitro compounds of the general formula $$C_6H_3-X-(NO_2)_2$$

wherein X means $$H, CH_3, Cl, NH.C_6H_5, NH.C_6H_4, CH_3, -S,$$

with glycerin and alkaline polysulfids, being gray brown powders, dissolving in form of their rough melts in water with brown color, from which solutions the dyestuffs are precipitated in brown flakes by addition of hydrochloric acid, and dyeing unmordanted cotton brown shades from a bath containing sodium sulfid.

3. The process of manufacturing brown sulfur dyestuffs consisting in melting together dinitrochlorbenzene with glycerin and alkaline polysulfids.

4. As new articles of manufacture the sulfur dyestuffs obtained by melting together dinitrochlorbenzene with glycerin and alkaline polysulfids, being gray brown powders, dissolving in form of their rough melts readily in water with brown color, from which solutions the dyestuffs are precipitated in brown flakes on addition of hydrochloric acid, and dyeing unmordanted cotton brown shades from a bath containing sodium sulfid.

In testimony, that I claim the foregoing as my invention, I have signed my name in presence of two witnesses, this tenth day of February 1908.

GEORG LIST.

Witnesses:
EVA SATTLER,
OSKAR STANDHARDT.